United States Patent [19]

Tsugekawa et al.

[11] 4,323,039
[45] Apr. 6, 1982

[54] ANTECHAMBER SYSTEM DIESEL ENGINE

[75] Inventors: Takanori Tsugekawa; Tosio Banba; Masakuni Matsui, all of Osaka, Japan

[73] Assignee: Yanmar Diesel Engine Co., Ltd., Osaka, Japan

[21] Appl. No.: 156,114

[22] Filed: Jun. 3, 1980

[30] Foreign Application Priority Data

Jun. 5, 1979 [JP] Japan .............................. 54-76055[U]

[51] Int. Cl.³ .............................................. F02B 3/00
[52] U.S. Cl. ..................................... 123/275; 123/256; 123/270; 123/271; 123/280; 123/281; 123/282; 123/286
[58] Field of Search ............... 123/268, 269, 273, 275, 123/281, 261, 270, 271, 281, 256, 286

[56] References Cited

U.S. PATENT DOCUMENTS

| | | | |
|---|---|---|---|
| 2,594,681 | 4/1952 | Ricardo et al. | 123/275 |
| 3,238,931 | 3/1966 | Rodriguez | 123/261 |
| 3,583,372 | 6/1971 | Hoffman | 123/275 |
| 3,592,172 | 7/1971 | Treiber | 123/275 |
| 4,006,720 | 2/1977 | Sato | 123/275 |
| 4,122,805 | 10/1978 | Kingsbury | 123/275 |
| 4,186,692 | 2/1980 | Kawamura | 123/275 |

*Primary Examiner*—Ronald B. Cox
*Attorney, Agent, or Firm*—Armstrong, Nikaido, Marmelstein & Kubovcik

[57] ABSTRACT

An antechamber system Diesel engine including an antechamber consisting of a front chamber and a rear chamber and a communication port communicating said antechamber with a main combustion chamber wherein at least one of fuel injection ports of a fuel injection nozzle sprays the fuel in the direction of the communication port. The rear chamber is formed integrally with a cylinder head inside the same while the front chamber is formed on a sleeve member detachably fitted to the cylinder head. If desired, a short axis column-like groove is defined between the front chamber and the rear chamber.

8 Claims, 9 Drawing Figures ns of a combustion chamber system Diesel engine.

ANTECHAMBER SYSTEM DIESEL ENGINE

BACKGROUND OF THE INVENTION

(1) Field of the Invention

This invention relates to an diesel engine combustion chamber system Diesel engine and more specifically to a Diesel engine having an antechamber-type combustion chamber.

(2) Description of the Prior Art

The diesel engine combustion chamber system of the coventional Diesel engine is classified into two types, one being a precombustion chamber type and the other being a swirl chamber type. The precombustion chamber type includes an combustion chamber consisting of a front chamber and a rear chamber having the same axis with each other inside a cylinder head, a communication port communicating the antechamber with a main combustion chamber defined in a piston, and a glow plug and a fuel injection nozzle each disposed in such a manner as to face the rear chamber. However, the conventional combustion chamber is formed by superposing two blocks one upon another via a packing between them, i.e., a block being provided with the latter half of the rear chamber and the other being provided with the former half of the rear chamber, the front chamber having its one end opening to the former half of the rear chamber and the communication port communicating the front chamber with the main combustion chamber formed in the piston. For this reason, the number of man-hour for the production of the combustion chamber is large and the production of the combustion chamber is high. In addition, the combustion chamber is not free from the drawback in that gas leak is apt to occur from the seam portion of the two blocks. Furthermore, when the tip portion of the glow plug is allowed to protrude into the rear chamber past through the cylinder head and through the block provided with the latter half of the rear chamber, gas leak tends to occur from the penetrating portion of the glow plug and also from the seam between the block and the cylinder head. Hence, the gas seal method becomes complicated and difficult.

On the other hand, in the swirl type combustion chamber, since the most parts of the combustion chamber are integrally formed with the cylinder head, there occurs a problem as to the mixing of the fuel and the air because the combustion chamber is defined by a single chamber, although this type is free from the above-mentioned problem of the fitting of the glow plug. In other words, although mixing of the air with the combustion fuel spray is effected by means of the swirl or vortex flow generated inside the antechamber by compression due to the piston, auxiliary mixing of the air with the fuel spray is not effected due to minute turbulence of the flow inside the combustion chamber. Hence, this type involves the problem in that occurrence of the exhaust gas smoke becomes greater than the above-mentioned precombustion chamber type.

SUMMARY OF THE INVENTION

It is therefore an object of the present invention to eliminate possible gas leak from the fitting portion of the glow plug, to reduce the cost of production and to facilitate mounting and dismounting of the glow plug.

It is another object of the present invention to reduce ignition delay by improving the formation of an air-fuel mixture and to improve the low temperature startability and the color of the exhaust gas.

It is still another object of the present invention to make smooth the outflow of the air-fuel mixture from the combustion chamber and to improve combustion performance.

It is still another object of the present invention to prevent the nozzle stick and to maintain the fuel injection performance.

It is still another object of the present invention to prevent heating of the fuel injection nozzle and to make it easy for the fuel injection nozzle to be accurately located.

In a combustion chamber system Diesel engine including a combustion chamber formed by a front chamber and a rear chamber inside a cylinder head, a communication port communicating said swirl chamber with a main combustion chamber defined in a piston, and a glow plug and a fuel injection nozzle each positioned to face the rear chamber, the first characterizing feature of the present invention resides in that the swirl chamber is defined by the rear chamber formed integrally with said cylinder head inside the same and the front chamber formed on a sleeve member detachably fitted to the cylinder head. In the combustion chamber system Diesel engine of the above-described type, the second feature of the present invention resides in that at least one cylindrical cavity is formed on the sleeve member to face the rear chamber. The third feature of the present invention resides in that at least one spray port of the fuel injection nozzle is so arranged as to spray the fuel in the direction of the communication port. The fourth feature of the present invention resides in that the inner diameter at the tip portion of the nozzle insertion hole is made smaller than the inner diameter at its intermediate portion. Further, the fifth feature of the present invention resides in that a support member having a small deformation quantity such as a washer or the like is interposed between the step portion of the fuel injection nozzle and the step portion of the nozzle insertion hole.

DESCRIPTION OF THE PREFERRED EMBODIMENTS

Figure 1:
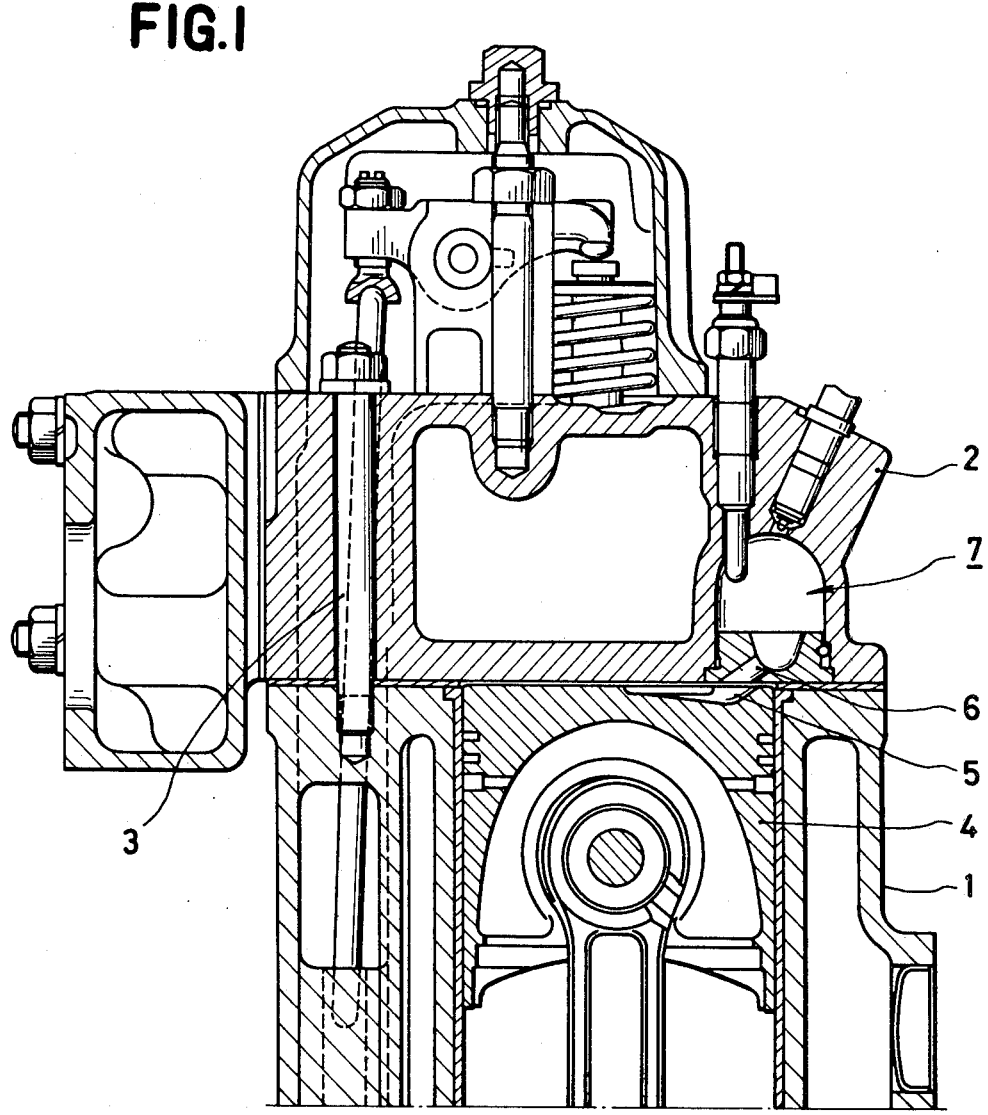
FIG. 1 is a sectional view of the upper half of the combustion chamber system Diesel engine in accordance with the present invention.

FIG. 1 shows the upper half of the combustion chamber system Diesel engine and a cylinder head 2 is shown fixed to a cylinder block 1 by means of bolts 3. An combustion chamber 7 is defined inside the cylinder head 2 and is communicated with a main combustion chamber 5, which is disposed at the head portion of a piston 4, by a communication port 6.

The construction will be explained in further detail with reference to FIG. 2. The above-mentioned combustion chamber 7 consists of a rear chamber 8 and a front chamber 9. The rear chamber 8 is formed inside the cylinder head 2 integrally therewith while the front chamber 9 is formed on a sleeve member 10. The sleeve member 10 is detachably fitted to the cylinder head 2 from below the same. The communication port 6 communicates with the front chamber 9. It is preferred that the combustion chamber 7 be positioned as closely as possible to one side of the cylinder head in order to prevent heating of the same. The upper half of the rear chamber 8 has a semi-spherical shape while the lower half has a column-like shape. The front chamber 9 has an inversed bullet-like shape. The ront chamber 9 is arranged with its axis $9c$ parallel to the axis $8c$ of the rear chamber 8 so that the axes do not overlap with each other.

Because of the presence of the front chamber 9, further minute turbulence is applied to the vortex flow of the air generated inside the combustion chamber during the compression stroke of the piston. Accordingly, it is possible to realize excellent combustion as mixing of the air with the spray of the fuel is improved and the concentration of the exhaust smoke (Sd) becomes lower.

Figure 9:
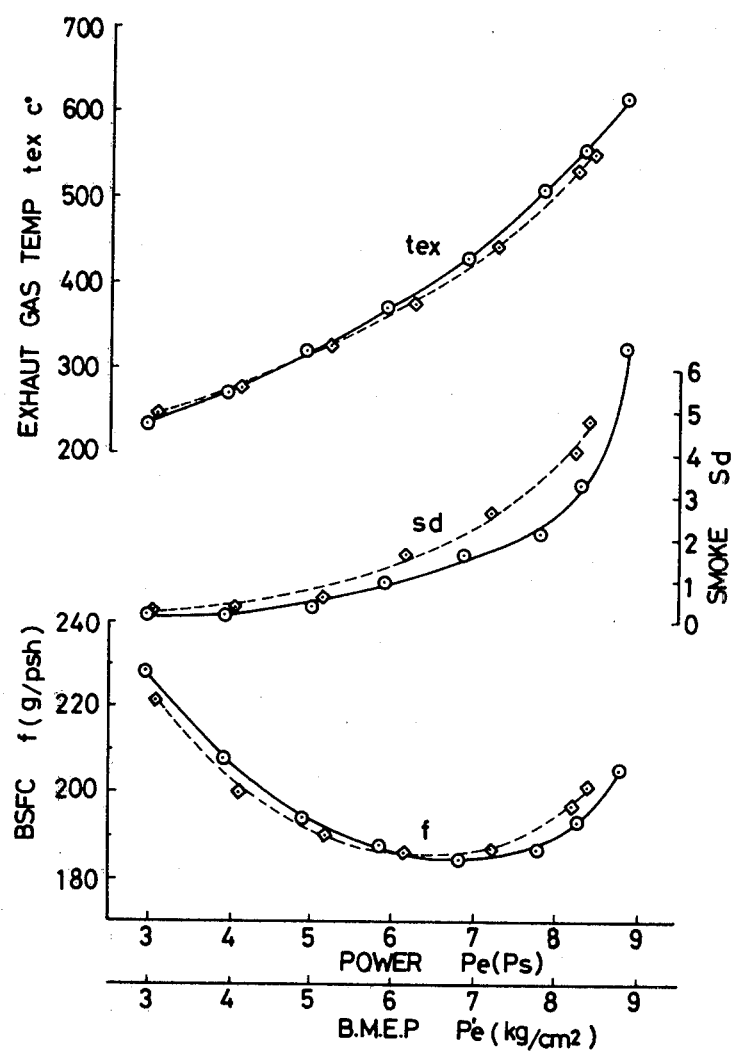
FIG. 9 is a performance diagram of a comet Va-type swirl combustion system Diesel engine and the combustion chamber system Diesel engine in accordance with the present invention shown in FIG. 1.

In other words, it can be appreciated readily from FIG. 9 that in comparison with the conventional comet Va-type Diesel engine equipped with the swirl type combustion chamber, the concentration of the exhaust smoke in the Diesel engine in accordance with the present invention is improved. As described above, the axis $9c$ of the front chamber is arranged in parallel to the axis $8c$ of the rear chamber. It is desirable, however, that the axis $9c$ is arranged relative to the axis $8c$ in such a direction as to further strengthen the vortex flow inside the combustion chamber, that is to say, in such a direction as to separate away from the center of the piston.

The best engine performance could be obtained if the volume of the front chamber is from 7 to 15% of the sum of the volume of the front chamber and that of the rear chamber, or the volume of the combustion chamber. The upper limit is so selected that the volume is not so large as to hinder the formation of the vortex flow and an excellent air-fuel mixture can be obtained due to the formation to further minute turbulent flows resulting from the presence of the front chamber without hindering the formation of the main vortex flow. On the other hand, the lower limit is so selected that the volume makes it possible to considerably restrict the drastic injection of the air-fuel mixture from the swirl chamber into the main combustion chamber as in the precombustion chamber system, by means of the presence of the front chamber so as to attain quiet combustion.

The abovementioned cylinder head 2 is equipped with a nozzle insertion hole 11 and with a glow plug insertion hole 12. A fuel injection nozzle 13 is inserted into the nozzle insertion hole 11. Due to the excellent agitation of the air stream, mixing of the fuel spray and the air can be realized sufficiently even by use of a single hole nozzle such as an ordinary throttle valve or pintle valve.

Another method of practising the invention will be explained in detail.

As the fuel injection nozzle 13 is used a hole nozzle of a double-port type. This nozzle is so set that the center of injection is between an angle $\alpha$ and an angle $\beta$. The angle $\alpha$ is determined by the outer circumference A of the communication port 6 and the point of intersection B of its diameter. The angle $\beta$ is determined by a corner portion C of the rear chamber 8 of the combustion chamber and a point D on a horizontal line H passing the center O of the rear chamber 8, which corresponds to the boundary between the upper half and the loer of the rear chamber.

The aforementioned nozzle insertion hole 11 is contracted so that the inner diameter of its tip portion is smaller than the inner diameter of its center portion and the exposed portion at the tip of the fuel injection nozzle 13 is reduced as much as possible. The arrangement minimizes the portion of the tip of the fuel injection nozzle 13 which is exposed to the combustion gas, and prevents the nozzle stick.

The glow plug 14 is fitted into the aforementioned glow plug insertion hole 12. The position of the tip of the glow plug 15 is positioned within the range encompassed by a line connecting the spray port 15 of the fuel injection nozzle 13 to the above-mentioned point D and the above-mentioned horizontal center line H. Accordingly, the fuel sprayed within the angle $\alpha$ impinges against the air stream within the combustion chamber that flows from the piston 4 through the communication port 6 during the compression stroke, thereby rapidly forming the air-fuel mixture. Hence, combustion is effected rapidly and the ignition delay is small. On the other hand, the fuel sprayed within the angle $\beta$ enables the start at an ultra-low temperature because the hole nozzle is employed as the fuel injection nozzle which ensures good atomization and the fuel comes into contact with the glow plug 14.

Figure 2:
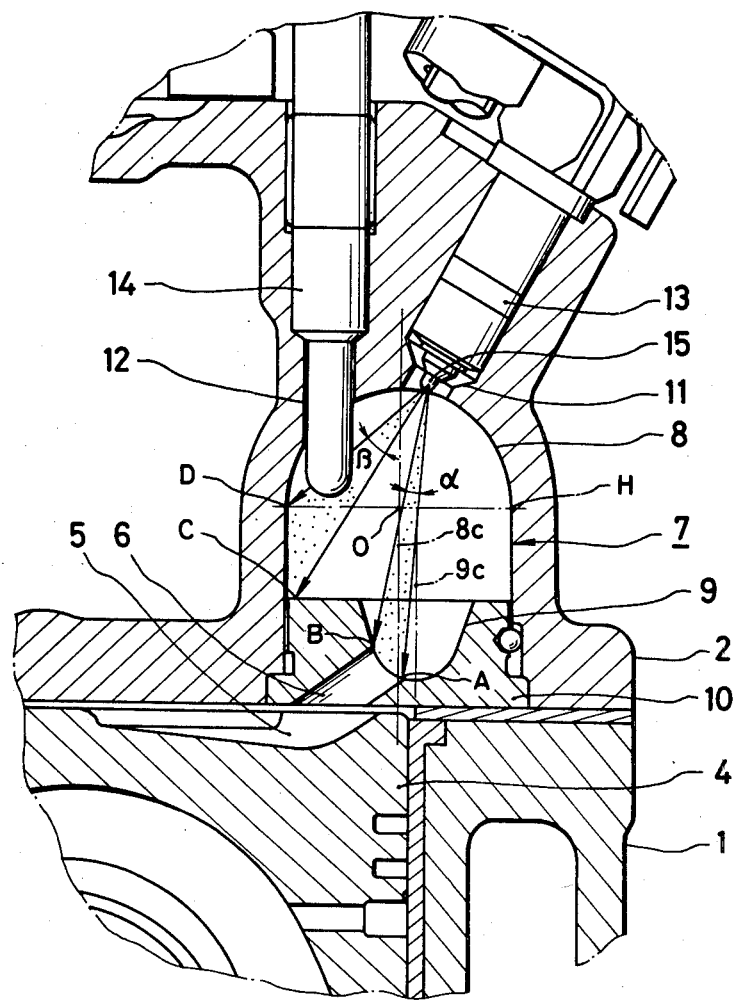
FIG. 2 is an enlarged sectional view of the portions in the proximity of the combustion chamber.
Figure 3:
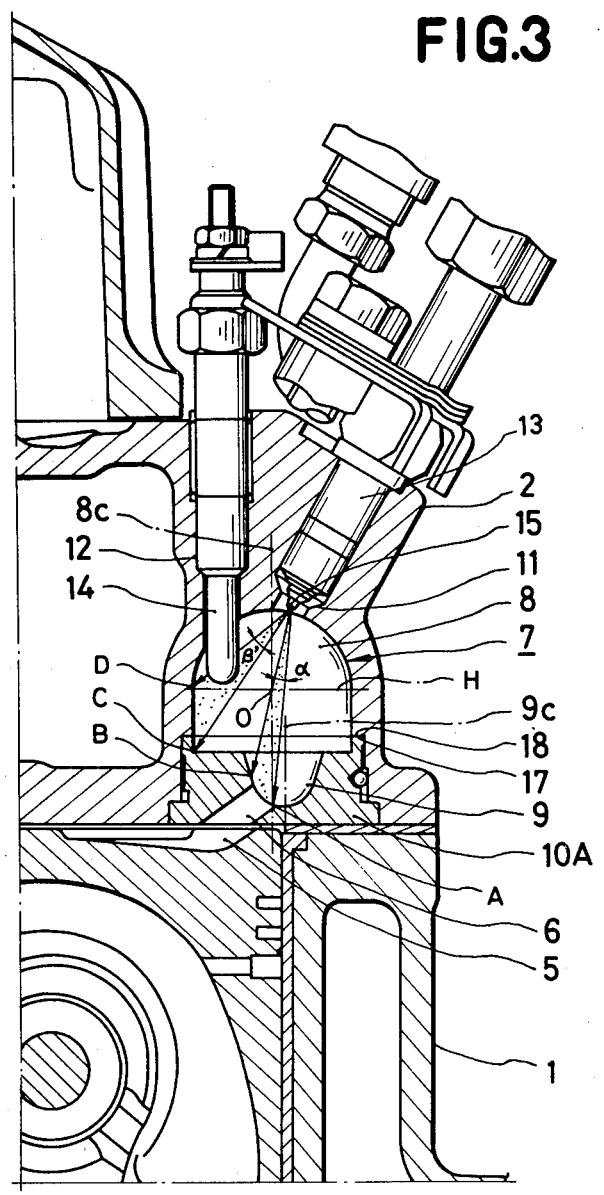
FIGS. 3 through 5 are sectional views each showing another embodiment of the combustion chamber.

FIG. 3 shows another embodiment of the present invention. The sleeve member 10A in this embodiment has a considerably greater diameter than that of the sleeve member 10 of FIG. 2. The upper end surface 17 of the sleeve member 10A fitted to the cylinder head 2 is brought into intimate contact with a shelf portion 18 of the sleeve member insertion hole via a gasket not shown in order to prevent leak of the gas. In this embodiment, a part of the rear chamber is formed in the sleeve member 10A.

Figure 4:
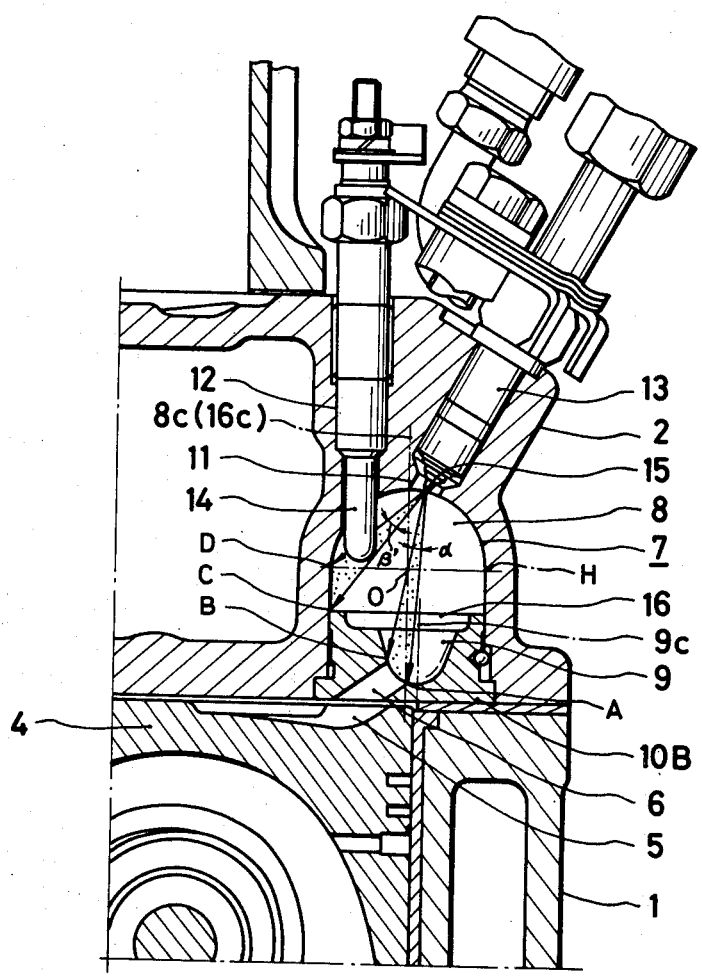

FIG. 4 shows still another embodiment of the present invention wherein the sleeve member 10B is equipped with a cylindrical cavity 16 which is positioned to face the opening of the rear chamber 9, is greater than the diameter of the open end of the front chamber but is smaller than the diameter of the lower end portion of the rear chamber 8. This groove 16 is disposed in such a manner that its axis $16c$ coincides with the axis $8c$ of the rear chamber 8. The height of the sleeve member 10B is increased so as to correspond to the depth of the groove 16.

Hence, when the double-port valve is employed, the fuel injection angle becomes a considerably narrower angle $\beta'$, though it remains unchanged for the throttle valve or the pintle valve as in the case of FIGS. 2 and 3. However, since the groove 16 is formed onthe sleeve member 10B, there is defined a step portion between the rear chamber 8 and the front chamber so that the air stream flowing into the combustion chamber 7 causes turbulence of the vortex flow formed in the combustion chamber 7 to ensure smooth mixing of the fuel with the air and the outflow of the air-fuel mixture to the main combustion chamber is accelerated.

Figure 5:
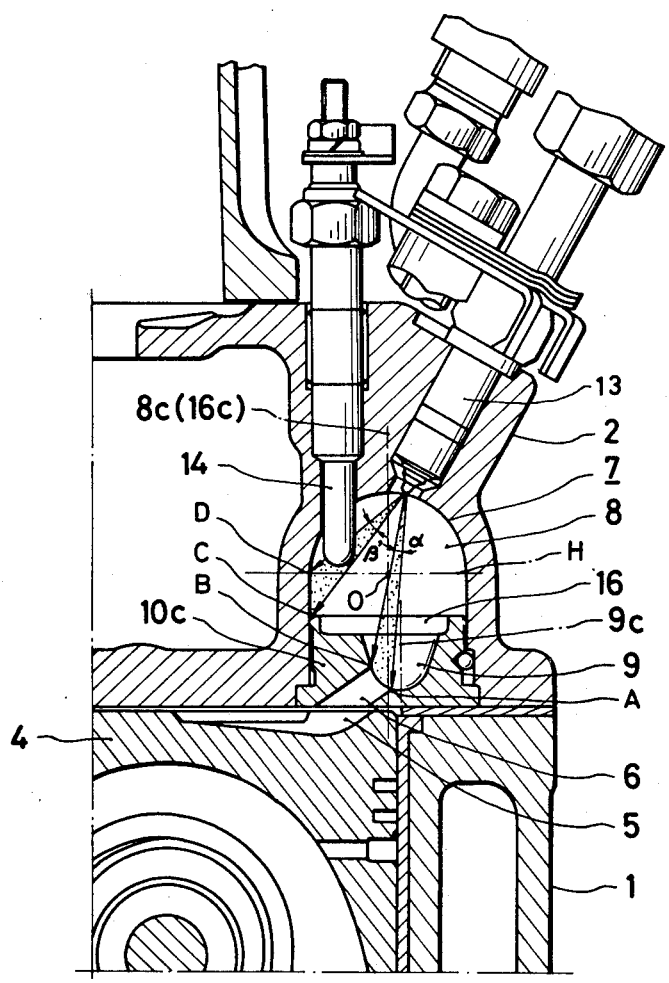

FIG. 5 shows another embodiment of the present invention, wherein the cavity 16 is defined on the sleeve member 10c in such a fashion that its axis 16c overlaps neither with the axis 8c of the rear chamber 8 nor with the axis 9c of the front chamber. This arrangement of the cavity 16 renders the turbulence of the vortex flow inside the antechamber 7 further complicated and further improves the formation of the air-fuel mixture.

Though the embodiments shown in FIGS. 4 and 5 have only one cavity 16, plural cavities 16 may be formed over several stages. In such a case, the cavity closer to the rear chamber must be provided with a greater diameter.

Figure 6:
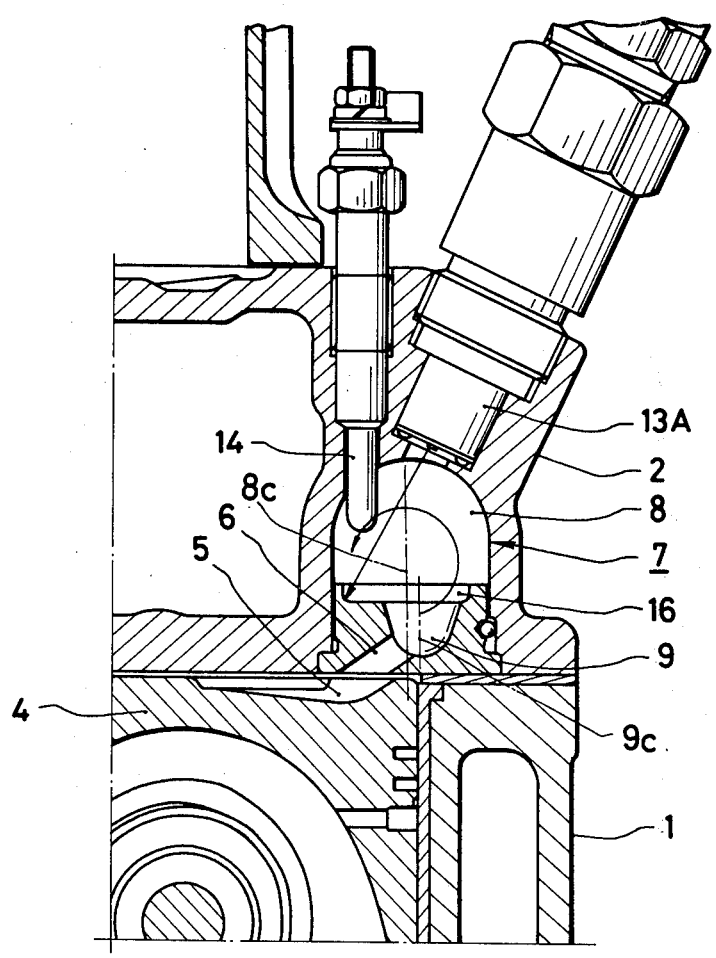
FIG. 6 is a sectional view of the single hole nozzle as the fuel injection nozzle.

FIG. 6 shows an improved embodiment which uses a single hole nozzle 13A such as a pintle nozzle or throttling nozzle. In this case, the fuel is injected towards the corner portion of the cavity 16. Mixing of the fuel injected towards the corner portion of the cavity 16 with the air is promoted by the vortex flow formed in the proximity of the cavity 16, thereby reducing the ignition delay.

Figure 7:
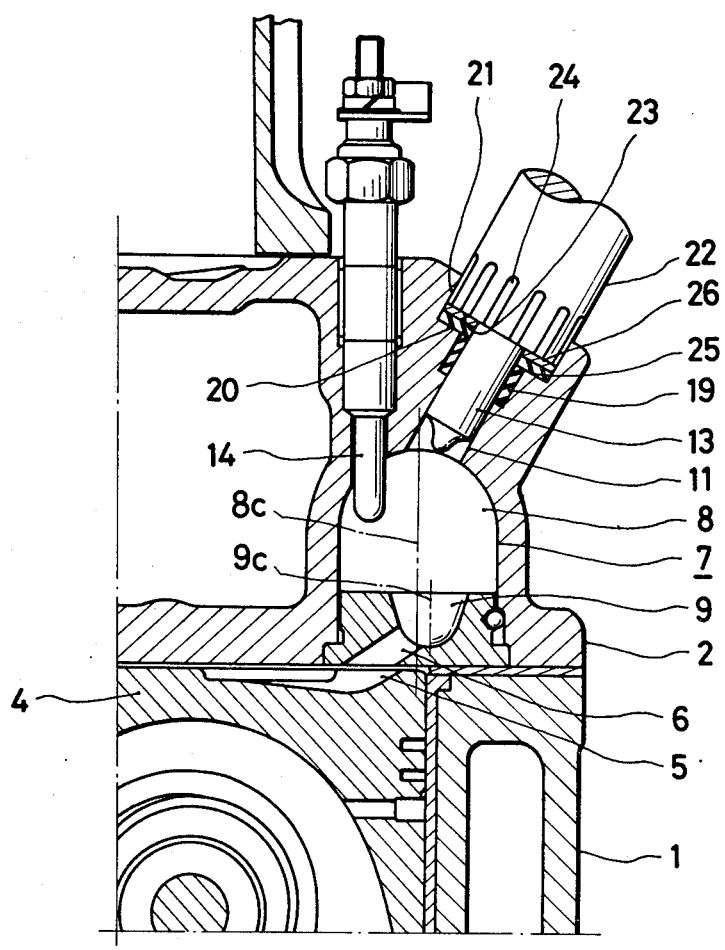
FIGS. 7 and 8 are sectional views of the embodiment wherein a heat insulating support member is interposed between the cylinder head and the fuel injection nozzle.

FIG. 7 shows an embodiment which prevents the heating of the fuel injection nozzle. An annular heat-insulating material 25 consisting of silicone rubber, for example, is placed on the seat portion 20 of the nozzle insertion hole 11. Between the heat insulating material 25 and the end surface 23 of the fuel valve casing 22 is interposed an annular support member 26 which has the same diameter as the insertion hole 21 for the insertion of the fuel valve case 22 and which has a small deformation quantity. This support member 26 prevents the heat insulating material 25 from coming into the gap between the fuel valve case 22 and the insertion hole therefor and into a recess 24 for clamping the fuel valve, defined around the circumference of the fuel valve case. The support member 26 also makes it possible to set the tip of the fuel injection nozzle 13 at a predetermined position. It is preferred to produce the support member 26 into an annular shape using a material which has a small deformation quantity, such as a metal, a heat-resistant resin, and so forth. A heat insulating material 19 is also packed around the fuel injection nozzle 13.

Figure 8:
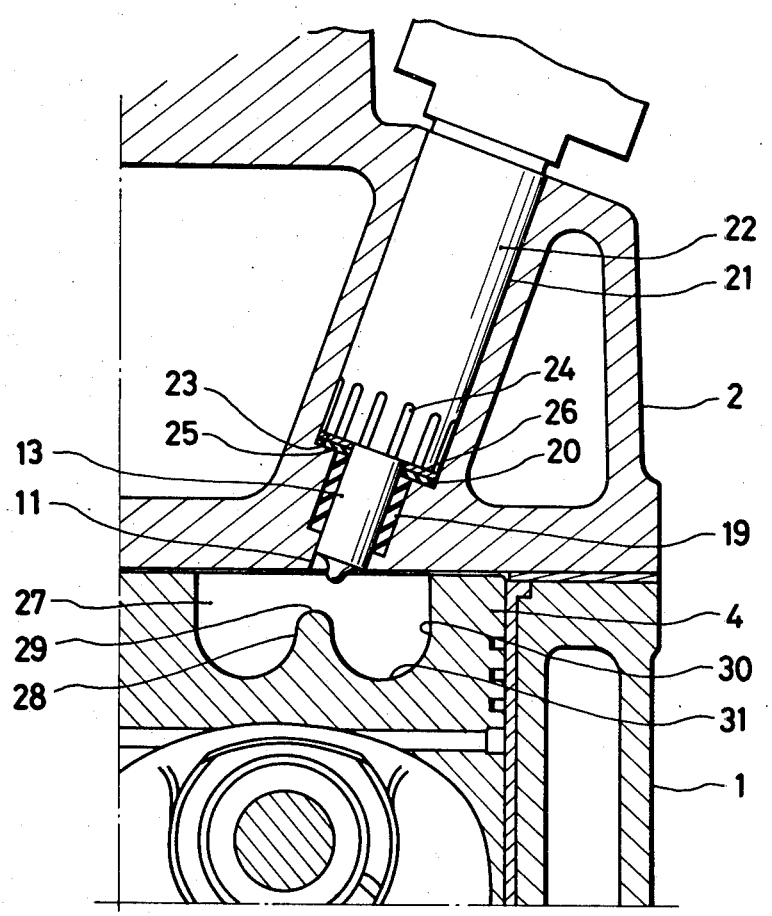

The same effect could be obtained as in FIG. 7 by adapting the support member 26 to the fuel injection nozzle 13 of a so-called "open combustion chamber" type Diesel engine, in which the fuel is sprayed directly to the combustion chamber at the head of the piston as shown in FIG. 8.

As shown in FIG. 8, a rod-like protuberance 28 is implanted at the center of the bottom of a recessed combustion chamber 2 and the bottom portion 31 between the rod-like protuberance 28 and the circumferential wall 30 of the combustion chamber is formed in a hemispherical shape. Also, the combustion chamber is positioned close to one side of the piston 4 so that the head 29 of the rod-like protuberance 28 is located on the axis of the fuel injection nozzle 13. The disposition of the combustion chamber enables the uniform mixing of the fuel with the vortex flow of the air inside the combustion chamber.

In summary, the diesel engine of this invention includes the combustion chamber having the front chamber and the rear chamber and the communication port communicating the combustion chamber with the main combustion chamber, and has such a construction that one of the spray ports of the fuel injection nozzle sprays the fuel in the direction of the communication port while the other sprays the fuel towards the flow plug. Accordingly, the fuel sprayed towards the glow plug comes into direct contact with the flow plug and is easily ignited, thereby improving the ultra-low temperature startability and eliminating the idle nock that has been the principal problem with the conventional combustion chamber system Diesel engine. On the other hand, the fuel sprayed towards the communication port impinges against the compressed air flowing from the communication port, rapidly forms the air-fuel mixture, and reduces the ignition delay with the aid of the atomization of the fuel. In other words, the combustion is effected rapidly.

Moreover, since the cavity is defined step-wise between the front chamber and the rear chamber, turbulence occurs in the compressed air flowing from the communication port so that mixing of the fuel with the air is accelerated.

In the present invention, the tip portion of the nozzle insertion hole for the insertion of the fuel injection nozzle is contracted into a small diameter so as to minimize the exposed portion at the tip of the fuel injection nozzle. For this reason, exposure of the tip portion of the fuel injection nozzle to the high temperature air-fuel mixture beomes less, thereby making it possible to prevent the nozzle stick. In accordance with the present invention, further, the heat insulating material interposed between the fuel injection nozzle and the nozzle insertion hole is supported by the support member having a small deformation quantity, the heat insulation material is prevented from coming into the gap between the fuel injection nozzle and the nozzle insertion hole and the position of the tip of the fuel injection nozzle can be set at predetermined positions.

EXAMPLE

Combustion performance test was carried out for the combustion chamber system Diesel engine in accordance with the present invention shown in FIG. 1. The exhaust gas temperature, the exhaust gas color and the fuel consumption ratio thus obtained were represented by solid lines, respectively, in FIG. 9.

In FIG. 9, the axis of abscissa represents the shaft output Pe (Ps) and the net average effective pressure Pe' (kg/cm$^2$) for each chart while the ordinate represents the exhaust gas temperature T° C. for the upper stage, the exhaust gas concentration index Sd for the middle stage and the fuel consumption ratio f (g/psh) for the lower stage.

The test conditions were as follows.
Number of Revolution: 2,400 rpm.
Piston Size: 80 mm$\phi$×75 mm
Number of Piston: 1
Fuel Injection Nozzle: throttling nozzle
Fitting Angle of the Fuel Injection
Nozzle: 20° relative to the axis 8c of the rear chamber.
Protrusive Length of Glow Plug inside the Rear Chamber: 7 mm
Shape and Size of the Upper Half of the Rear Chamber: semi-sphere of a radius of 12 mm with the center O of the rear chamber as its center.
Depth of the Front Chamber: 8.5 mm
Distance between the axes of the Rear Chamber and the Front Chamber: 2 mm
Angle of Elevation of the Communication Port: 35°

For comparison, the combustion performance test was also carried out for the comet Va-type swirl type Diesel engine. The exhaust gas temperature, the exhaust gas color and the fuel consumption ratio thus obtained were represented by chain lines in FIG. 9. The test conditions were the same as above.

It would be appreciated from FIG. 9 that when the combustion chamber in accordance with the present invention is employed, the exhaust gas color can be specifically improved.

What is claimed is:

1. In a combustion chamber system Diesel engine including: a combustion chamber formed by a front chamber and a rear chamber inside a cylinder head; a communication port communicating said combustion chamber with a main combustion chamber defined in a piston; and a glow plug mounted in a glow plug insertion hole formed in said cylinder head and a fuel injection nozzle mounted in a nozzle insertion hole in said cylinder head, each positioned in said cylinder head, adjacent said rear chamber; the improvement wherein said combustion chamber includes said rear chamber formed integrally with said cylinder head inside said cylinder head and said front chamber formed on a sleeve member detachably fitted to said cylinder head and facing said rear chamber, wherein the axes of said front chamber and said rear chamber are parallel and offset with respect to each other and wherein the diameter of the portion of said front chamber facing said rear chamber is less than the diameter of the facing portion of the rear chamber.

2. In a combustion chamber system Diesel engine including: a combustion chamber formed by a front chamber and a rear chamber inside a cylinder head having a glow plug insertion hole and a nozzle insertion hole; a communication port communicating said combustion chamber with a main combustion chamber defined in a piston; and a glow plug mounted in said glow plug insertion hole and a fuel injection nozzle, positioned in said nozzle insertion hole, each positioned in said cylinder head, adjacent said rear chamber; the improvement wherein said combustion chamber includes said rear chamber formed integrally with said cylinder head inside said cylinder head and said front chamber formed on a sleeve member detachably fitted to said cylinder head, said sleeve member having a cylindrical cavity formed therein, facing said rear chamber and having a diameter less than the diameter of the facing portion of the rear chamber.

3. The combustion chamber system Diesel engine as defined in claim 1 wherein the fuel injection port of said fuel injection nozzle positioned to face said rear chamber is of a multiple-port type and at least one of said multiple ports is so arranged as to spray the fuel in the direction of said communication port.

4. The combustion chamber system Diesel engine as defined in claim 3 wherein the inner diameter at the tip portion of a fuel injection nozzle insertion hole for the insertion of said fuel injection nozzle is made smaller than the inner diameter at the center portion of said fuel injection nozzle insertion hole.

5. The combustion chamber sysem Diesel engine as defined in claim 2 wherein said cylindrical cavity is positioned such that its axis does not coincide with the axis of said front chamber.

6. The combustion chamber system Diesel engine as defined in claim 2 wherein the axes of said front chamber, said rear chamber and said cylindrical cavity do not coincide with one another.

7. The combustion chamber system Diesel engine as defined in claim 5 or 6 wherein the fuel injection port of said fuel injection nozzle adjacent said rear chamber is of a multiple-port type and at least one of said multiple ports is so arranged as to spray the fuel in the direction of said communication port.

8. The combustion chamber system Diesel engine as defined in claim 7 wherein the inner diameter at the tip portion of a fuel injection nozzle insertion hole for the insertion of said fuel injection nozzle is made smaller than the inner diameter at the center portion of said fuel injection nozzle insertion hole.

* * * * *